United States Patent
Wu et al.

(10) Patent No.: US 10,971,311 B2
(45) Date of Patent: Apr. 6, 2021

(54) VARIABLE CAPACITOR

(71) Applicants: Yingchao Wu, Guangdong (CN); Song Chen, Guangdong (CN); Hang Luo, Guangdong (CN)

(72) Inventors: Yingchao Wu, Guangdong (CN); Song Chen, Guangdong (CN); Hang Luo, Guangdong (CN)

( * ) Notice: Subject to any disclaimer, the term of this patent is extended or adjusted under 35 U.S.C. 154(b) by 26 days.

(21) Appl. No.: 16/361,214

(22) Filed: Mar. 22, 2019

(65) Prior Publication Data
US 2020/0303128 A1 Sep. 24, 2020

(51) Int. Cl.
| | |
|---|---|
| H01G 5/04 | (2006.01) |
| H01G 5/38 | (2006.01) |
| H01G 5/013 | (2006.01) |
| H01G 5/011 | (2006.01) |
| H01G 5/16 | (2006.01) |
| H01G 4/12 | (2006.01) |

(52) U.S. Cl.
CPC .............. H01G 5/04 (2013.01); H01G 4/1209 (2013.01); H01G 5/011 (2013.01); H01G 5/013 (2013.01); H01G 5/16 (2013.01); H01G 5/38 (2013.01)

(58) Field of Classification Search
CPC ........... H01G 4/232; H01G 5/04; H01G 5/38; H01G 5/013; H01G 5/011; H01G 5/16; H01G 4/1209
USPC ......... 361/283.4, 283.1, 277, 287, 288, 290, 361/291
See application file for complete search history.

(56) References Cited

U.S. PATENT DOCUMENTS

| | | | |
|---|---|---|---|
| 6,336,365 B1* | 1/2002 | Blackadar | G01P 15/0922 73/514.34 |
| 2004/0012299 A1* | 1/2004 | Quenzer | H01G 5/14 310/309 |
| 2007/0180923 A1* | 8/2007 | Liu | H01G 5/0136 73/780 |
| 2009/0201269 A1* | 8/2009 | Kato | H01L 27/124 345/174 |
| 2018/0068795 A1* | 3/2018 | Park | H01G 4/232 |

* cited by examiner

*Primary Examiner* — Arun Ramaswamy

(57) ABSTRACT

A variable capacitor is disclosed. The variable capacitor includes a multi-layer ceramic capacitor member, and a capacitance varying mechanism. The multi-layer ceramic capacitor member includes one or two external electrode(s), a ceramic dielectric, and a plurality of electrode layers positioned inside the ceramic dielectric. The capacitance varying mechanism includes an electrical conductor positioned aside and approximate to the ceramic dielectric. The electrical conductor is deformable responsive to a pressure applied thereon, and an area of the electrical conductor in contact with the ceramic dielectric varies in accordance with the pressure, thus varying a capacitance value between the external electrode(s) and the electrical conductor. In general, the external electrode(s) of the multi-layer ceramic capacitor member serve(s) as fixed electrode(s) of the variable capacitor.

13 Claims, 4 Drawing Sheets

VARIABLE CAPACITOR

BACKGROUND OF THE INVENTION

The present invention relates to a variable capacitor, and particularly, to a variable capacitor employing an external electrode of a multi-layer ceramic capacitor serving as its fixed electrode(s).

Typically, a conventional plate capacitor, as shown in FIG. 1, is consisted of an electrode A, an electrode B, and a dielectric member C positioned there between. Such a plate capacitor is configured with a fixed capacitance, and therefore its application is very limited. In addition, such plate capacitors are normally large sized, inconvenient for installment, thus not adaptive for specific applications.

$$C = \varepsilon * \varepsilon_0 * S/d, \quad (1)$$

The capacitance of a plate capacitor is defined in accordance formula (1), in which C represents capacitance with F (Faraday) as unit; $\varepsilon$ represents relative dielectric constant; $\varepsilon_0$ represents vacuum dielectric constant ($8.86 \times 10^{-12}$) with F/m as unit; S represents area with $m^2$ as unit; and d represents the distance between electrode plates with m (meter) as unit.

U.S. Pat. No. 5,206,785 disclosed a variable capacitor. As shown in FIG. 2, the variable capacitor includes an electrode A', corresponding to the plate electrode A as shown in FIG. 1, a deformable disc-like member B' corresponding to the plate electrode B as shown in FIG. 1, and a dielectric disc C' corresponding to the dielectric member C as shown in FIG. 1.

In most variable capacitors, the areas of electrodes are usually less than 100 $mm^2$, and a 0.2 mm thick ring with an inner cavity and an air gap is often remained between the dielectric member and the deformable electrode. Under the standard atmosphere pressure, the relative dielectric constant of dry $CO_2$-free air is "$\varepsilon$=1.00053". According to formula (1), the capacitance of the variable capacitor as shown in FIG. 2 is lower than 0.1 pf.

FIG. 3 demonstrates the structure of the variable capacitor of U.S. Pat. No. 5,206,785. When an external pressure applied, the deformable disc-like member B' deforms and contacts the dielectric disc C', thus the air gap disappears. Accordingly, the capacitance varies. As disclosed by U.S. Pat. No. 5,206,785, the dielectric disc C' is made of $TiO_2Sr_4O_y$, and its relative dielectric constant is 7000. When the thickness of the dielectric disc C' is 2 mm, and the area of the deformable disc-like member B' in contact with the dielectric disc C' is 1 $mm^2$, the capacitance in accordance with the formula (1) is 31.01 pf. Such a capacitance is convenient to measure with a simple measuring circuit.

The variable capacitors disclosed by U.S. Pat. No. 5,206,785 have been widely applied in electronic pens, serving as sensors measuring the pressure applied by the pen tips.

However, $TiO_2Sr_4O_y$ is a very hard sintered-ceramic material, and a polishing process is often needed to assure a solid contact between the deformable disc-like member B' and the dielectric disc C'. Further, a complicated metal coating process shall be adopted to configure a solid conductive electrode onto the ceramic material. In addition, an electronic pen typically offers very limited room for the sensor, and therefore the ceramic material shall also be precisely cut and processed. As such, due to the complicated processing technologies employed as aforementioned, the sensor is too expensive to be widely used.

BRIEF SUMMARY OF THE INVENTION

To overcome the defects of the conventional technologies, the present invention provides a cost-effective variable capacitor. The present invention employs an external electrode of a multi-layer ceramic capacitor serving as its fixed electrode(s).

The present invention provides a variable capacitor. The variable capacitor includes a multi-layer ceramic capacitor member, and a capacitance varying mechanism. The multi-layer ceramic capacitor member includes one or two external electrode(s), a ceramic dielectric, and a plurality of electrode layers positioned inside the ceramic dielectric. The capacitance varying mechanism includes an electrical conductor positioned aside and approximate to the ceramic dielectric. The electrical conductor is deformable responsive to a pressure applied thereon, and an area of the electrical conductor in contact with the ceramic dielectric varies in accordance with the pressure, thus varying a capacitance value between the external electrode(s) and the electrical conductor. In general, the external electrode(s) of the multi-layer ceramic capacitor member serve(s) as fixed electrode(s) of the variable capacitor.

According to an aspect of the present invention, the external electrodes are provided at at least two sides of the ceramic dielectric.

According to an aspect of the present invention, two external electrodes are respectively positioned at two sides of the ceramic dielectric and are respectively electrically connected to the electrode layers inside the ceramic dielectric, and the electrode layers are positioned in an interlacing manner.

According to an aspect of the present invention, a gap is remained between the electrical conductor and the ceramic dielectric, and when an external pressure is applied on the electrical conductor, the electrical conductor deforms to contact the ceramic dielectric, and the gap disappears.

According to an aspect of the present invention, when the pressure applied to the electrical conductor is released, the electrical conductor leaves away from the ceramic dielectric, and the gap recovers.

According to an aspect of the present invention, the variable capacitor further includes an auxiliary insulation member provided between the multi-layer ceramic capacitor member and the electrical conductor.

According to an aspect of the present invention, one of the external electrodes is designated as an electrical connection point of the variable capacitor.

According to an aspect of the present invention, the two electrical electrodes are electrically connected as a whole serving as an electrical connection point of the variable capacitor.

According to an aspect of the present invention, the electrical conductor serves as another electrical connection point.

According to an aspect of the present invention, the capacitance varying mechanism further includes a mechanical driving structure. The mechanical driving structure is configured with a round-shaped or dome-shaped external surface and is adopted for applying the pressure onto the electrical conductor.

According to an aspect of the present invention, a plurality of variable capacitors are electrically connected in series and/or in parallel and thus adopted for application as an array.

The variable capacitor according to the present invention, relative to the conventional technologies, has the following advantages:

1. The variable capacitor of the present invention is adopted to achieve variable capacitance via application of external pressure, which is convenient for production;

2. The electrical conductor is made of elastic or flexible material, and when the pressure is released, the deformed electrical conductor recovers to the original status, thus allowing repeatedly operation of the variable capacitor.

3. The employment of the auxiliary insulation structure allows varying the capacitance with less deformation of the electrical conductor, and therefore achieving longer lifespan. In addition, it further allows continuous variation of the contact area of the electrical conductor with the multi-layer ceramic capacitor member, thus obtaining the desired capacitance value within a relatively large range.

4. The variable capacitor provided by the present invention employs multi-layer structure which is feathered with lower cost and adjustable capacitance. Further, by adoption of different connection options of the external electrodes, an even larger range of capacitance adjustment is achievable.

5. In combination with interlaced electrode layers of the multi-layer ceramic capacitor member, when the electrical conductor is applied with pressure, the contact area varies, and therefore the variable capacitor realizes a well linear and precise capacitance adjustment.

6. According to the variable capacitor of the present invention, the external electrodes of the multi-layer ceramic capacitor member serve as a fixed electrode of the variable capacitor, and the external electrodes are adopted to be connected in series or in parallel, and thus convenient for application in array.

7. The variable capacitor according to the present invention is designed with a simple structure and employs common parts, and therefore the production cost can be well controlled.

These and other features, aspects, and advantages of the present invention will become better understood with regard to the following description, appended claims, and accompanying drawings.

DETAILED DESCRIPTION OF THE INVENTION

Figure 1:
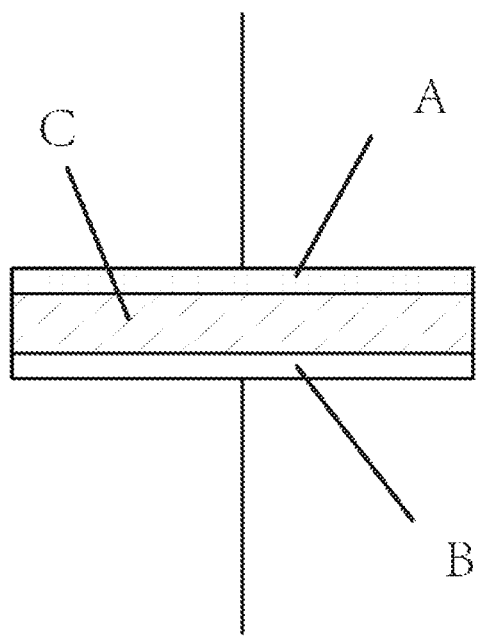
FIG. 1 is a structural diagram showing a conventional plate capacitor.
Figure 2:
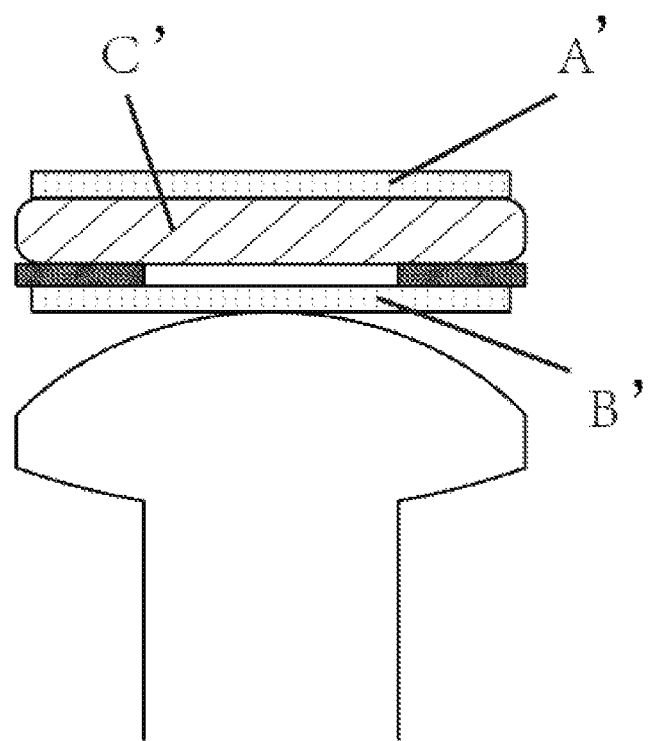
FIG. 2 is a structural diagram showing a variable capacitor disclosed by U.S. Pat. No. 5,206,785.
Figure 3:
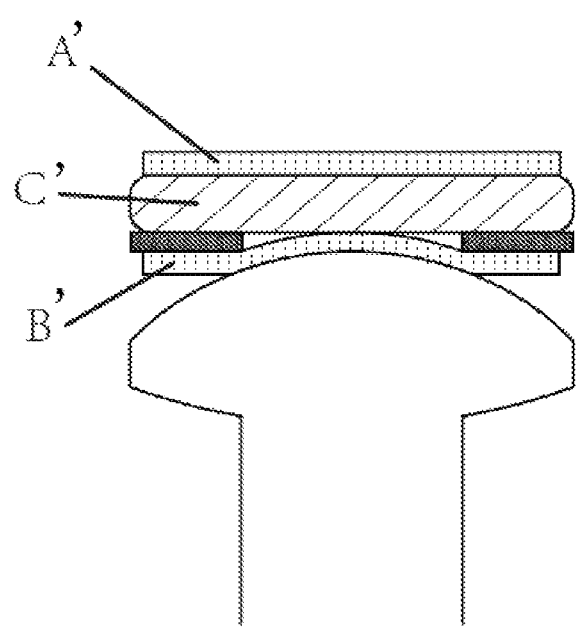
FIG. 3 demonstrates the structural mode of an operation status of the variable capacitor of U.S. Pat. No. 5,206,785, in which when an external pressure is applied the deformable disc-like member deforms.
Figure 4:
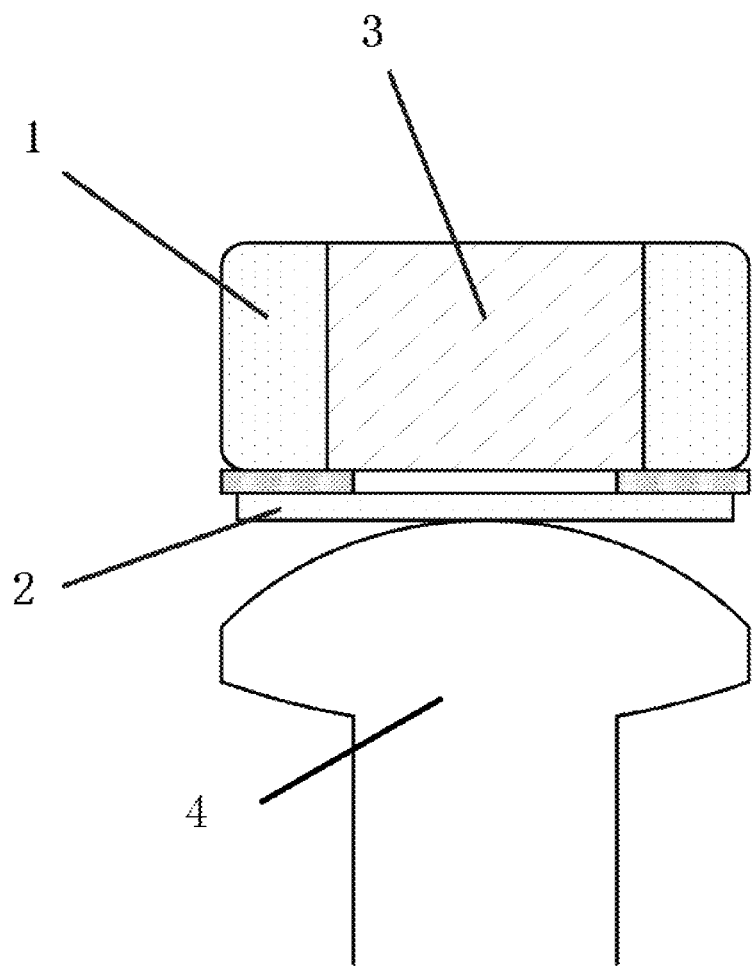
FIG. 4 is a structural diagram illustrating a variable capacitor of the present invention.
Figure 5:
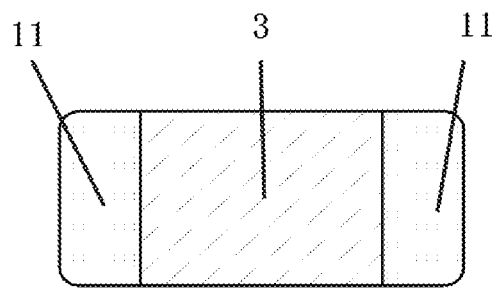
FIG. 5 illustrates a multi-layer ceramic capacitor member of the present invention.
Figure 6:
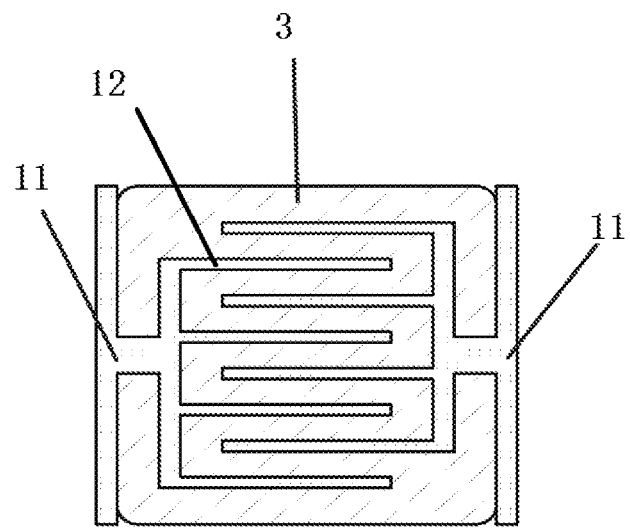
FIG. 6 is a cross-sectional view of the multi-layer ceramic capacitor member of the present invention.
Figure 7:
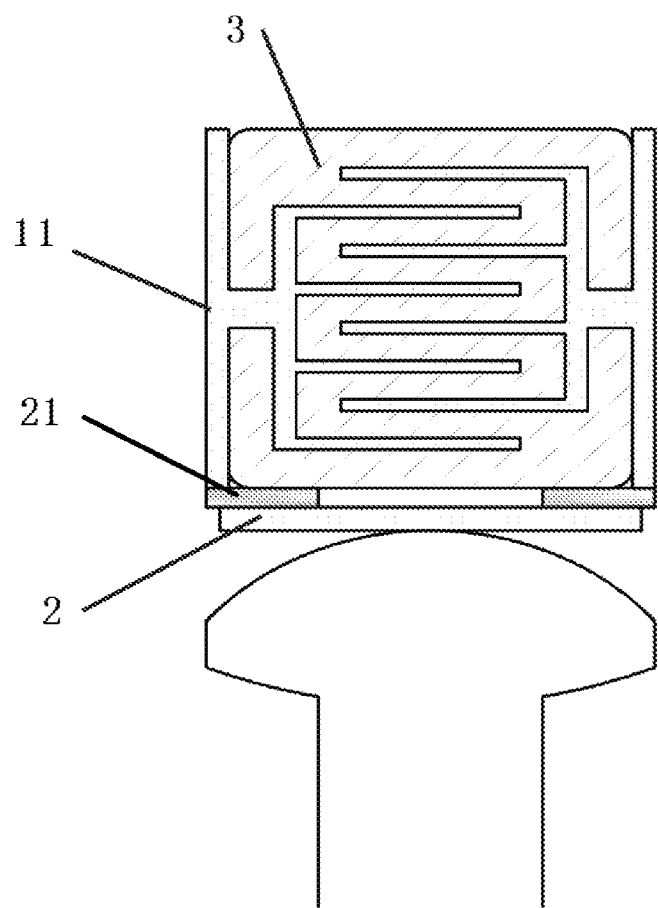
FIG. 7 is a cross-sectional view of the variable capacitor of the present invention.

FIG. 4 is a structural diagram illustrating a variable capacitor of the present invention. FIG. 5 illustrates a multi-layer ceramic capacitor member of the present invention. FIG. 6 is a cross-sectional view of the multi-layer ceramic capacitor member of the present invention. FIG. 7 is a cross-sectional view of the variable capacitor of the present invention. Referring to FIGS. 4 to 7, the variable capacitor includes a multi-layer ceramic capacitor member 1 and a capacitance varying mechanism. The multi-layer ceramic capacitor member includes one or two external electrode(s) 11, a ceramic dielectric 3, and a plurality of electrode layers 12 positioned inside the ceramic dielectric 3. The capacitance varying mechanism includes an electrical conductor 2 positioned aside and approximate to the ceramic dielectric 3. The electrical conductor 2 is deformable responsive to a pressure applied thereon, and an area of the electrical conductor 2 in contact with the ceramic dielectric 3 varies in accordance with the pressure, thus varying a capacitance value between the external electrode(s) 11 and the electrical conductor 2. In general, the external electrode(s) 11 of the multi-layer ceramic capacitor member 1 serve(s) as fixed electrode(s) of the variable capacitor.

As shown in FIG. 6, according to an embodiment of the present invention, two electrode layer 12 are provided inside the ceramic dielectric 3, and are positioned in an interlacing manner. Such a structure is favorable in saving the area of the ceramic dielectric 3.

Assuming that the length of the multi-layer ceramic capacitor member is 3.2 mm, and the width is 2.5 mm, and its thickness is 1.8 mm, while the dielectric material is X5R. The relative dielectric constant of X5R material is between 1000 to 20000. Therefore, the distance between the utmost one of the electrode layers 12 to the outer surface of the multi-layer ceramic capacitor member 3 is less than 0.9 mm, and the area of the outer surface of the multi-layer ceramic capacitor member 3 is greater than 4 mm2. In assumption of that the relative dielectric constant of the ceramic dielectric 3 is 7000, and the contact area of the electric conductor 2 with the ceramic dielectric 3 is 1 mm2, in accordance with the formula (1), the capacitance between the electric conductor 2 and the external electrodes 11 of the ceramic dielectric 3 is greater than 60 pf. In practice, when applying suitable pressure onto the deformable electrical conductor 2, the variable capacitor of the present invention can conveniently realize adjustable capacitance in a range of 1 pf to 100 pf.

According to an embodiment of the present invention, a gap is remained between the electrical conductor 2 and the ceramic dielectric 3, and when an external pressure is applied on the electrical conductor 2, the electrical conductor 2 deforms to contact the ceramic dielectric 3, and the gap disappears. When the external pressure is removed, then the electrical conductor 2 recovers and leaves away from the ceramic dielectric 3, and the gap is reinstated.

In addition, conventional multi-layer ceramic capacitors are featured with relatively low equivalent resistance, high temperature/pressure resistance, small in size, wide capacitance range, and are accordingly widely used elements in electronic industry. Correspondingly, multi-layer ceramic capacitors are cheap in price. The variable capacitor of the present invention innovatively employs a multi-layer ceramic capacitor member 1, and having the external electrodes 11 of the multi-layer ceramic capacitor 1 serving as the fixed electrode(s) of the variable capacitor. In comparison with the variable capacitor disclosed by U.S. Pat. No. 5,206,785, the present invention is more convenient in production, and cheaper in cost.

According to a further embodiment of the present invention, the variable capacitor further includes an auxiliary insulation member 21 provided between the multi-layer ceramic capacitor member 1 and the electrical conductor 2.

According to another embodiment of the present invention, one of the external electrodes 11 is designated as an electrical connection point of the variable capacitor.

Alternatively, according to another embodiment of the present invention, the two electrical electrodes 11 are electrically connected as a whole serving as an electrical connection point of the variable capacitor, and the electrical conductor 2 serves as another electrical connection point.

According to still another embodiment of the present invention, the variable capacitor further includes a mechanical driving structure 4. The mechanical driving structure 4 is configured with a round-shaped or dome-shaped external surface and is adopted for applying the pressure onto the electrical conductor. The electrical conductor is made of elastic or flexible material so that when the pressure is removed, the deformation of the electrical conductor recovers and the gap becomes reinstated.

According to the present invention, the external electrode(s) 11 serve(s) as a fixed electrode and the electrical conductor 2 serves as a moving electrode of the variable capacitor.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A variable capacitor, comprising:
   a multi-layer ceramic capacitor member, the multi-layer ceramic capacitor member comprising:
   one or two external electrode(s);
   a ceramic dielectric; and
   a plurality of electrode layers positioned inside the ceramic dielectric in an interlacing manner; and
   a capacitance varying mechanism, the capacitance varying mechanism comprising:
   an electrical conductor, positioned aside and approximate to the ceramic dielectric, wherein the electrical conductor made of elastic or flexible material which is deformable responsive to a pressure applied thereon by a mechanical driving structure, and an area of the electrical conductor in contact with the ceramic dielectric varies in accordance with the pressure, thus varying a capacitance value between the external electrode(s) and the electrical conductor,
   wherein an auxiliary insulation member is provided between the multi-layer ceramic capacitor member and the electrical conductor so as to form a gap, the external electrode(s) serve(s) as fixed electrode(s) of the variable capacitor, and the electrical conductor serves as a moving electrode of the variable capacitor.

2. The variable capacitor according to claim 1, wherein the two external electrodes are respectively positioned at two sides of the ceramic dielectric and are respectively electrically connected to the electrode layers inside the ceramic dielectric.

3. The variable capacitor according to claim 1, wherein the gap is remained between the electrical conductor and the ceramic dielectric, and when the external pressure is applied on the electrical conductor, the electrical conductor deforms to contact the ceramic dielectric, and the gap disappears.

4. The variable capacitor according to claim 3, wherein when the pressure applied to the electrical conductor is released, the electrical conductor leaves away from the ceramic dielectric, and the gap recovers.

5. The variable capacitor according to claim 1, wherein one of the external electrodes is designated as an electrical connection point of the variable capacitor.

6. The variable capacitor according to claim 1, wherein the two electrical electrodes are electrically connected as a whole serving as an electrical connection point of the variable capacitor.

7. The variable capacitor according to claim 1, wherein the electrical conductor serves as another electrical connection point.

8. The variable capacitor according to claim 1, wherein the mechanical driving structure is configured with a round-shaped or dome-shaped external surface and is adopted for applying the pressure onto the electrical conductor.

9. The variable capacitor according to any of claim 1, wherein a plurality of variable capacitors are electrically connected in series and/or in parallel.

10. A variable capacitor for electronic pen, comprising:
    a multi-layer ceramic capacitor member, the multi-layer ceramic capacitor member comprising:
    a ceramic dielectric;
    two external electrodes provided on both sides of the ceramic dielectric;
    wherein a plurality of electrode layers extending from the external electrodes and positioned inside the ceramic dielectric in an interlacing manner;
    wherein a capacitance varying mechanism comprises an electrical conductor made of elastic or flexible material positioned aside and approximate to the ceramic dielectric, an auxiliary insulation member is provided between the multi-layer ceramic capacitor member and the electrical conductor so as to form a gap, and a mechanical driving structure applies a pressure to the electrical conductor so as to cause the electrical conductor to deform towards the gap, an area of the electrical conductor in contact with the ceramic dielectric varies in accordance with the pressure, the two electrical electrodes serve as fixed electrode, and the electrical conductor serves as a moving electrode of the variable capacitor.

11. The variable capacitor for electronic pen according to claim 10, wherein the mechanical driving structure is configured with a round-shaped or dome-shaped external surface for applying the pressure to the electrical conductor.

12. The variable capacitor for electronic pen according to claim 10, wherein the two electrical electrodes are electrically connected as a whole serving as an electrical connection point of the variable capacitor.

13. The variable capacitor for electronic pen according to claim 12, wherein the electrical conductor serves as another electrical connection point.

* * * * *